Sept. 6, 1932.  A. S. WHEELBARGER ET AL  1,876,119
REGISTER
Filed July 26, 1929   2 Sheets-Sheet 1
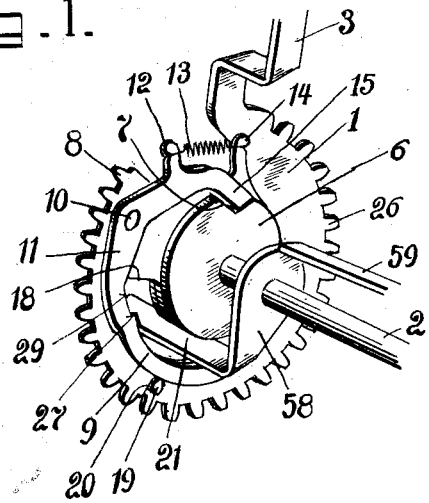
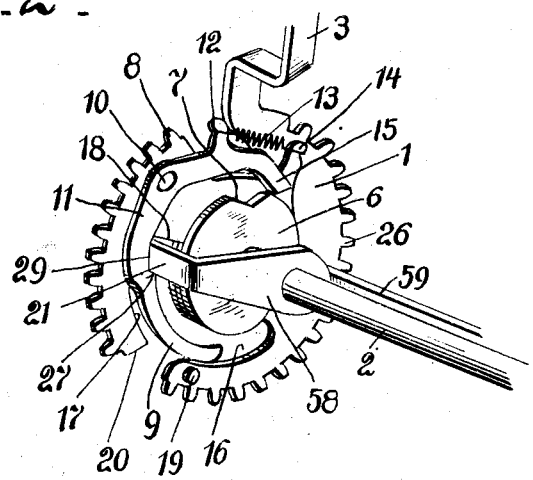
INVENTORS
Albert S. Wheelbarger &
Peter Keil
BY H.W. Baker
ATTORNEY

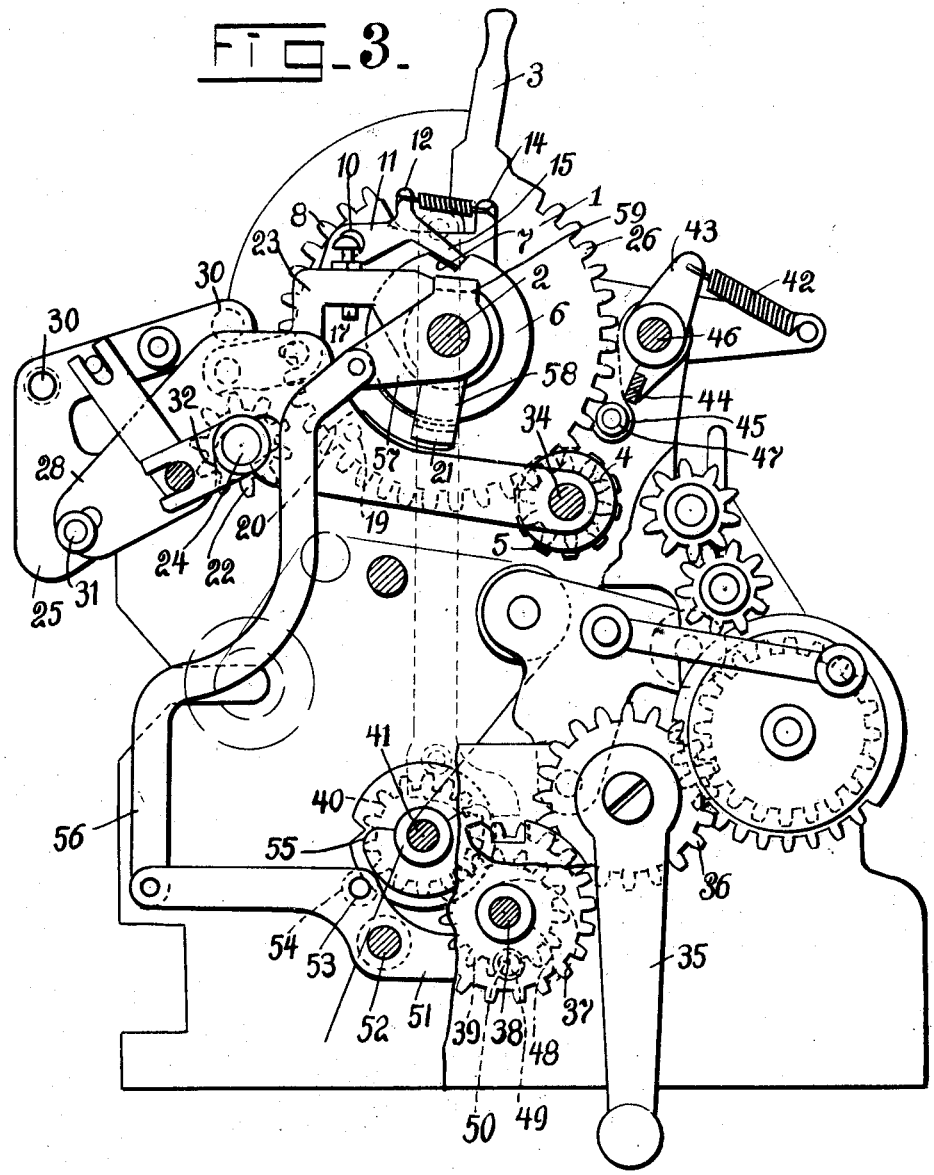

Patented Sept. 6, 1932

1,876,119

UNITED STATES PATENT OFFICE

ALBERT S. WHEELBARGER AND PETER KEIL, OF DAYTON, OHIO, ASSIGNORS TO OHMER FARE REGISTER COMPANY, OF DAYTON, OHIO

REGISTER

Application filed July 26, 1929. Serial No. 381,137.

This invention is an improvement on registers and in particular on the totalizer for a register.

In the application of Albert S. Wheelbarger and Grover C. Coil, Serial Number 238,662, filed December 28, 1927, a totalizer for a register is disclosed. In the said application keys or levers are moved to a position corresponding to the number to be added, each of which keys is connected to a disk which is operatively connected with a segment gear so that the segment gear is correspondingly moved with the said disk. After this setting movement the totalizer gears are brought into mesh with the said segment gears and means are provided to thereafter move the segment gears to a fixed stopping point. By this arrangement each of the segment gears would be actuated on its adding movement a distance complemental to the distance it had previously moved. This adding movement of the segmental gears would not move the key levers or the disks for means were provided to disconnect the segmental gears from the disks on the adding movement of the segmental gears. It was found, however, that a person might maliciously move one of the segmental gears by the insertion of a screw driver or other instrument so as to render ineffective the correct operative relationship between the segmental gears and the setting disks by rotating one relative to the other. The object of this invention is to prevent any unauthorized tampering with the segmental gears which form a part of the actuating means for the totalizer wheels.

Referring to the drawings:

Fig. 1 is a vertical perspective view of a part of the setting lever, its disk, one of the segmental gears and the operative connection between the gear and the disk, the parts being shown in home position.

Fig. 2 is a view similar to Fig. 1 but showing the parts in one of the positions in which they would be while the machine was being operated.

Fig. 3 is a right-side elevational view of the entire machine.

Disks 1 are rotatably mounted on a shaft 2. These disks and mechanism carried thereby are exact duplicates and a description of one will suffice for all. Each of the disks 1 is actuated by a manual lever or key 3. Each of the disks 1 is provided with gear teeth 26 which gear teeth mesh with a pinion 4 secured to a type printing wheel 5. Each of said disks 1 has secured thereto a disk 6 having a notch 7 therein. The disk 6 is spaced a slight distance from the disk 1 and a segmental gear 8 is rotatably mounted on the shaft 2 between the disks 1 and 6. The segmental gear 8 carries a pin 10 on which is mounted a bell crank lever 11. The bell crank lever 11 is provided with a lug 12 to which is secured a spring 13 which is also secured to a lug 14 carried by the segmental gear 8. The lever 11 has an arm 15 which normally lies in the notch 7 as shown in Fig. 1 but may ride on the periphery of the disk 6 as shown in Fig. 2. The bell crank lever 11 is provided with an arcuate extension 9 which lies immediately in front of the bar 21 and is of a shape that corresponds with the arcuate movement of said bar 21. At the upper end of the arcuate extension 9 of the bell crank lever 11 is a shoulder 27 and immediately above the shoulder is a recess 29 which has a sufficient depth so that when the bar 21 moves upwardly and engages the segmental gear 8 the arm 15 may be cammed out of the notch 7 which will rotate the bell crank lever 11 anti-clockwise as viewed in Figs. 1 and 2. The segmental gear 8 is provided with an arcuate channel 17 which channel terminates in an upper wall 18. The disk 1 is provided with a similar channel 16 forming a continuation of the channel 17. The disk 1 is provided with a stop pin 19 which engages the lowermost end 20 of the segmental gear 8.

The totalizer numeral wheels 32 are mounted on a shaft 24 which shaft is journaled in frame members 25. The frame members 25 are secured together by cross-bars 30 and 31. The shaft 24 and cross-bar 31 extend into grooves 32 and 33 respectively in stationary frame members 28 which are supported by the arms 23 and the shaft 34 on which the printing wheels 5 are mounted. The said grooves 32 and 33 extend in the same direction as is clearly shown in Fig. 3 so as to guide the frame member 25 to cause the totalizer numeral wheels 22 to engage the segmental gears 8.

The means to move the frame 25 so that the totalizer wheels will be brought into engagement with the segmental gears 8 and then disengaged therefrom forms no part of the invention shown in this application and need not be described in detail. It might be mentioned, however, that the totalizer wheels are disengaged from the segmental gears 8 when the disk 1 and key levers 3 are being set during which movement the segmental gears 8 move with the disk 1. The totalizer wheels 22 are then brought into mesh with the segmental gears 8 and upon the operation of the bar 21, as will be hereinafter described, each of the segmental gears 8 make no movement until the bar 21 reaches the upper wall 18 of the segmental gear 8, at which time the said bar 21 lies immediately behind the recess 29. As the bar 21 continues its upward movement it rocks each of the segmental gears 8 upwardly thereby turning the totalizer wheels an amount corresponding to the amount set up by the key levers 3. As soon as the segmental gears 8 commence their upward movement the arm 15 is cammed out of the notch 7 against the tension of the spring 13 so that the shoulder 27 engages beneath the bar 21 the bar 21 being locked in the recess 29. As the bar 21 commences its downward movement it pulls the bell crank lever 11 and segmental gear 8 downwardly by means of the shoulder 27 until the arm 15 reaches the notch 7 in the disk 6 which is remaining stationary so that the arm 15 is pulled into the notch 7 by means of the spring 13 thereby disengaging the shoulder 27 of the bell crank lever 11 from the bar 21. As the bar 21 continues its downward movement it slides along the inner surface of the arcuate extension 9. Attention is called to the fact that the extension 9 of the bell crank lever 11 always lies against the bar 21 when the machine is not being operated so that no one could take a screw driver or other instrument and move the segmental gear 8 relative to the disk 1 for the parts are locked together by means of the arm 15 extending within the notch 7. Furthermore, it is impossible to disengage the arm 15 from the notch 7 except by operating the machine and thereby rotating the bar 21. There is only one way that relative movement between the segmental gears 8 and the disk 1 can be obtained and that is by operating the machine and thereby raising and lowering the bar 21.

There would be a tendency for the disk 1 to rotate clockwise when the segmental gear 8 is thus rotated unless it is held against such movement. In order to provide a brake to prevent such movement we have provided a spring 42 which is attached to a lever 43 which carries a cross bar 44 which bears against one edge of a lever 45 which lever 45 is loosely mounted on a shaft 46 and carries a roller 47 which engages the gear teeth 26. In order, therefore, for the disk 1 to make any movement it is necessary to exert such force thereon as to overcome the tension of the spring 42. The spring 42 is constructed of sufficient strength so as to resist the tendency of the disk 1 to rotate with the segmental gear 8 when the machine is being operated.

The bar 21 is given its upward and downward movement by the following means: A crank handle 35 is operatively connected with a gear 36 which meshes with a gear 37 on a shaft 38 which shaft carries a second gear 39 which meshes with a gear 40 on a shaft 41. The shaft 38 is provided with a cam 48 which engages a roller 49 mounted on a pin 50 carried by a bell crank lever 51 pivoted on a rod 52 which is mounted on the frame work of the machine. The lever 51 also carries a pin 53 on which is mounted a roller 54 which engages a cam 55 secured to the shaft 41. The cams 48 and 55 are on opposite sides of the fulcrum of the lever 51 and are so positioned that as the crank handle 35 rotates the cam 55 holds the lever 51 in the position shown in Fig. 3 for the roller 54 in riding on the periphery of the cam 55 which cam extends for slightly more than 180°. As the said cam passes beyond the roller 54, the cam 48 engages the roller 49 rocking the right end of the lever 51 downwardly immediately after the cam 55 has passed beyond the roller 54. As the crank handle 35 continues its rotation the cam 48 passes beyond the roller 49 and the roller 54 is again engaged by the cam 55 which shifts the lever 51 into its initial position which is shown in Fig. 3. The lever 51 is therefore rocked up and down on the last part of the rotation of the crank handle 35 and as it moves up and down it carries a link 56 connected therewith which link is also connected to a crank arm 57, which crank arm is rotatably mounted on the shaft 2 and is integrally connected to an arm 58 of which the bar 21 is a part, extending at right angles thereto, as is shown clearly in Figs. 1 and 2. The crank arm 57 is connected to the arm 58 by means of a cross-bar 59, the said cross-bar being integral with both the arm 58 and the crank arm 57. By the above described construction the bar 21 is given one complete upward and downward movement at each operation of the machine.

Having now described our invention, we claim:

1. In a machine of the type described, a setting member, a disk secured thereto and provided with a notch, a gear, a lever carried by said gear, an arm forming a part of said lever and seated in said notch when the parts are in normal position, a spring secured to said lever so as to urge said arm into said notch when said notch is adjacent said arm, and means to prevent said arm being moved out of said notch when the machine is idle.

2. In a machine of the type described, a setting member, a disk provided with a notch secured thereto, a gear, a lever carried by said gear having one of its ends normally seated in said notch, an operating bar, an arcuate extension carried by said lever and normally lying immediately contiguous to said bar so as to prevent any movement of said lever inwardly so as to unseat the other end of the lever from said notch, said lever being provided with a recess so that when said operating bar is operating said gear said recess is adjacent said bar so that upon further actuation of said bar the end of said lever seated in said notch may be cammed out of the same so that said gear may rotate relative to said setting member.

3. In a machine of the type described, a setting member, a disk provided with a notch secured thereto, a gear, a lever carried by said gear, means tending to hold one of the ends of said lever in said notch, an operating bar, an arcuate extension carried by said lever and normally lying immediately contiguous to said bar so as to prevent any movement of said lever inwardly so as to unseat the other end of the lever from said notch, said lever being provided with a recess so that when said operating bar is operating said gear said recess is adjacent said bar so that upon further actuation of said bar the end of said lever seated in said notch may be cammed out of the same so that said gear may rotate relative to said setting member.

ALBERT S. WHEELBARGER.
PETER KEIL.